June 22, 1937. H. P. DONLE 2,084,795
SYSTEM AND METHOD FOR SECURING THIRD DIMENSIONAL
EFFECTS WITH A SINGLE IMAGE
Filed Dec. 16, 1933  2 Sheets-Sheet 1
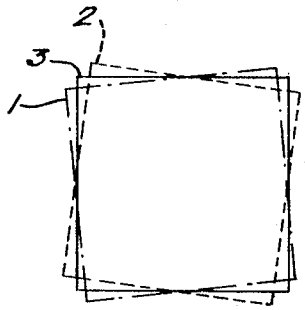
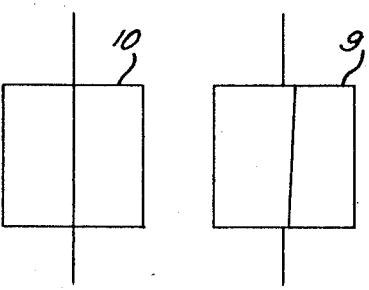
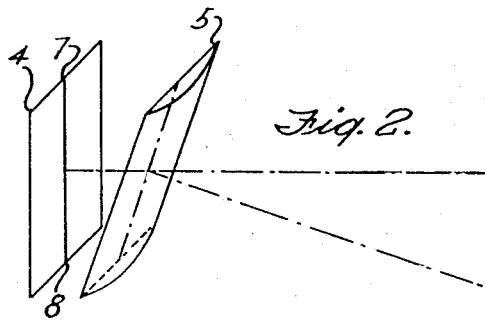
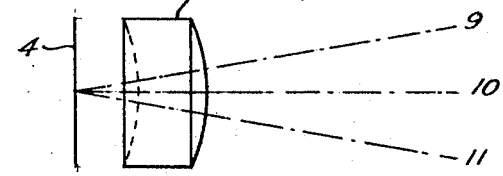
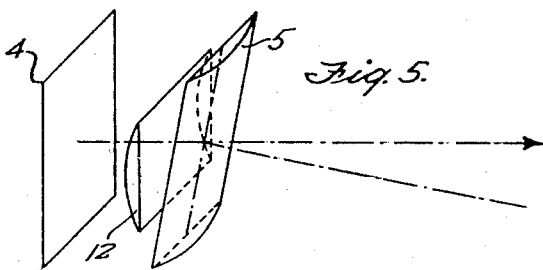
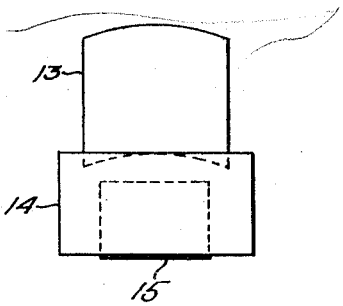
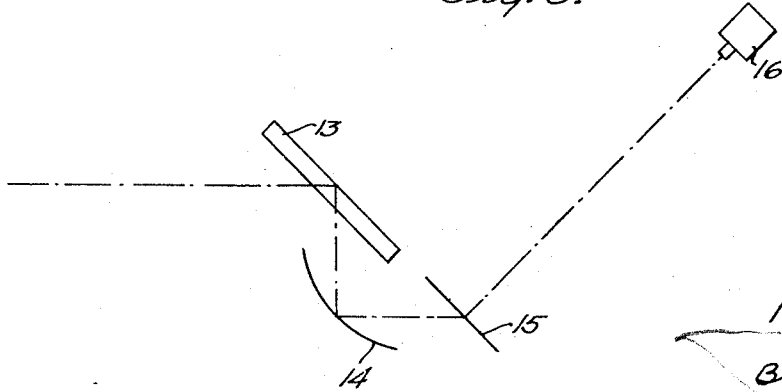
INVENTOR
HAROLD P. DONLE
BY
ATTORNEY June 22, 1937.  H. P. DONLE  2,084,795
SYSTEM AND METHOD FOR SECURING THIRD DIMENSIONAL
EFFECTS WITH A SINGLE IMAGE
Filed Dec. 16, 1933   2 Sheets-Sheet 2
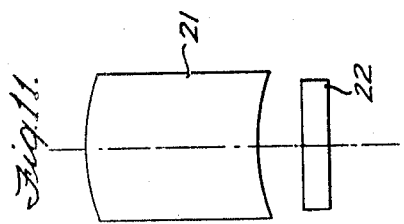
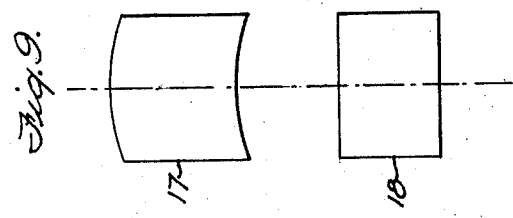
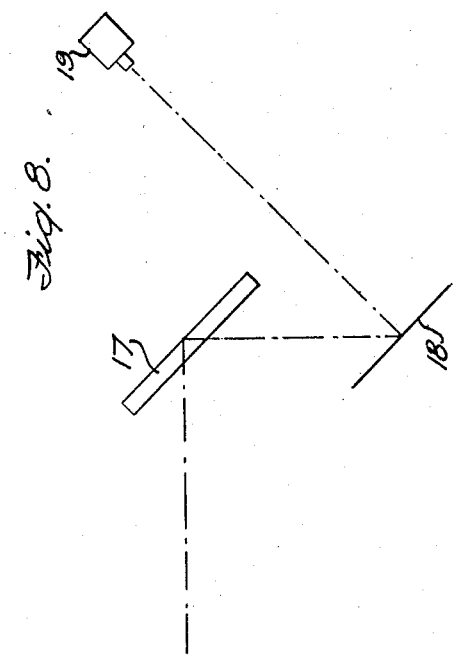
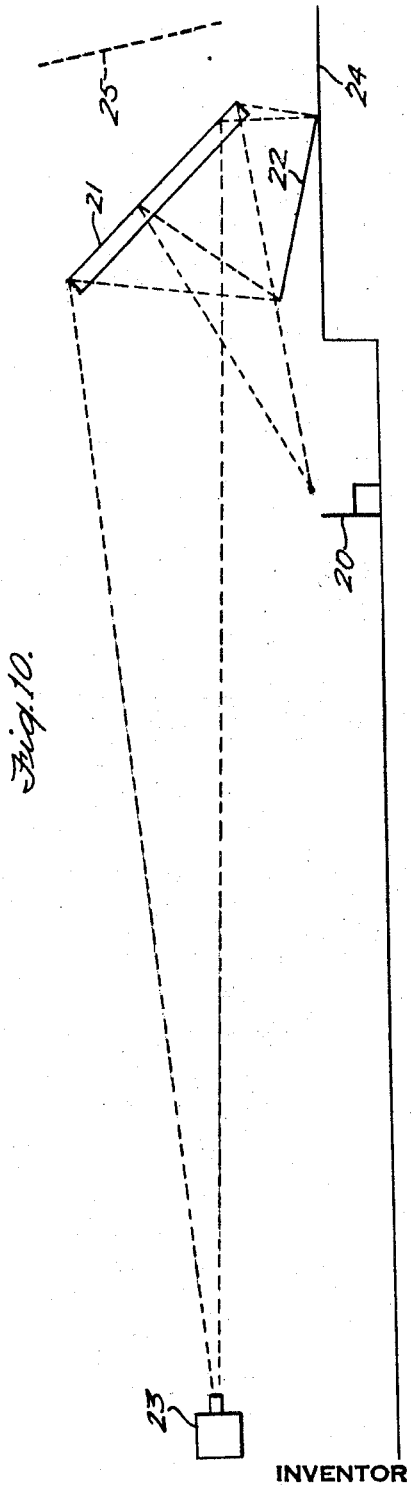
INVENTOR
HAROLD P. DONLE
BY
ATTORNEY Patented June 22, 1937

2,084,795

UNITED STATES PATENT OFFICE 2,084,795

SYSTEM AND METHOD FOR SECURING THIRD DIMENSIONAL EFFECTS WITH A SINGLE IMAGE

Harold P. Donle, Meriden, Conn., assignor of one-half to Chester H. Braselton, New York, N. Y.

Application December 16, 1933, Serial No. 702,744

14 Claims. (Cl. 88—16.6)

This invention relates to a system and a method for securing depth or third dimensional effects from single flat images and is applicable to still or motion picture projection as well as to viewing photographs or other pictures.

One of the objects of the invention is to provide a simple, inexpensive, and effective apparatus for creating a depth or third dimensional effect from a flat picture.

Another object of the invention is to provide an apparatus which may be installed in a motion picture theatre so that the audience will get the effect of depth from the projected image irrespective of their distances from the screen.

Another object of the invention is to provide a method of creating a third dimensional effect in a single flat image by causing one eye of an observer to see the image slightly rotated with respect to the image as seen by the other eye.

Other objects of the invention will be apparent as the description thereof proceeds.

Several embodiments of the invention as well as the principles involved are illustrated in the following drawings in which:

Fig. 1 is a diagram showing the angular displacement of images of the same picture;

Fig. 2 is a diagram illustrating the method of securing eye selection of images;

Fig. 3 is a plan view of the parts as arranged in Fig. 2;

Fig. 4 is a diagram of effect obtained with the arrangement of Fig. 2;

Fig. 5 is a diagram of apparatus similar to that of Fig. 2 with the addition of a corrective lens;

Fig. 6 is an elevational view of an arrangement using cylindrical mirrors;

Fig. 7 is a front view of the arrangement of Fig. 6;

Fig. 8 is a modified form of the arrangement of Fig. 6;

Fig. 9 is a front view of the apparatus of Fig. 8;

Fig. 10 is an elevational view of a simplified form of the arrangement of Fig. 8; and Fig. 11 is a front view of the arrangement of Fig. 10.

Various methods have been proposed and developed to give a printed or projected picture a depth dimension in order to more nearly reproduce the sensation of reality. These effects have been variously called "stereoscopic", "relief", and "third dimension".

A true stereoscopic system calls for special photography, two pictures being taken simultaneously with two cameras, their optical systems spaced apart and their axes parallel, and the resultant pictures being viewed through a device which causes them to appear superimposed. The depth effects secured with this system are greatly exaggerated and the result is as unnatural as a flat picture in the opposite sense. The principal cause of this is that the distance between observer and picture must appear in the same relation under which the photographs were originally made, and at no other distances will the picture appear correct.

I have discovered that a sensation of depth and distance may be secured from a single ordinary picture where some means is provided whereby the observer's two eyes see the picture differently and in such a manner that there will be an angular displacement between the two images; in other words so that one image is slightly rotated with respect to the other.

For example, if a simple square drawn on a white card can be made by some means to appear to each eye with a different angular displacement, as in Fig. 1, where 1 might be the square as seen with one eye and 2 the square as seen with the other eye, and when the two eyes see their respective squares at the same time, the result will appear as an average of 1 and 2, as 3 in the same figure. Furthermore at the same time the square will appear somewhat lifted and tilted from the surface of the card. The probable reason for this result is that when the right and left eyes are slightly rotated on their optical axes to align the two squares the resultant strain on the eye muscles is registered on the brain as distance.

It is obvious that to secure this effect means must be provided whereby each eye can see only one and the proper square, such for example, as color filters which have been previously used for other purposes where eye selection is desired.

If an ordinary picture is selected for illustration it will appear from the observer somewhat removed from its base and wholly natural as far as depth is concerned.

To secure these effects it is necessary to use something interposed between the observer and the picture which will cause each eye to see the picture differently, that is, with some angular displacement in the same plane. The simple method which I have discovered for securing this selection is to view the picture through a cylindrical lens which is located close to the picture in order that magnification will be only slight. This lens is also positioned so that magnification takes place in a horizontal plane from left to right; in other words its cylindrical axis is vertical and its optical axis slightly tilted from the horizontal, or from a line drawn between the observer's eyes and the picture. The relative arrangement of parts is shown in Fig. 2 where 4 is the picture, 5 the cylindrical lens with its axis tilted from a line drawn between the eye 6 and the picture 4. To explain the operation of this arrangement, 4 may be a plain card with a black line drawn from 7 to 8. If this line is observed with one eye from several different horizontal points to right and left of the lens axis, for example as shown more clearly in Fig. 3 where this line is observed through the lens at three different points 9, 10, and 11, the line will appear to tilt slightly as the location of observation is altered and will appear to one eye somewhat as shown in Fig. 4 which gives the appearance of this line above, below, and through the lens at each of the three locations. Instead of moving the eyes it can be assumed that the distance from 9 to 11 in Fig. 3 is approximately equal to the natural displacement of human eyes. The right eye will then see the image 9 of Fig. 4 and the left eye the image 11 of the same figure, but the two eyes when used together will each be slightly rotated and the line will appear as indicated at 10. At the same time it will appear to have become separated and tilted from the surface of the card on which it is drawn.

The use of a cylindrical lens in this manner may produce a slight amount of distortion due to the fact that it magnifies in only one plane. This will cause the picture to appear somewhat wider than normal. This effect may be compensated for by the addition of a second cylindrical lens 12 as shown in Fig. 5. This lens plays no part in securing the third dimensional effects but is useful only to correct lateral distortion as caused by the first lens. It should be noted, however, that this lens must have its optical axis nearly parallel to a line joining the picture and the eye and its axis of curvature 90° to the axis of the lens 5.

The use of such a lens is quite impractical with large pictures, particularly projected pictures of the type shown in the usual theatre. In order to utilize this principle under such conditions I have discovered that the same effect can be obtained with cylindrical mirrors. In one arrangement of this system I use two concave mirrors. These mirrors may be made of metal which will in the first place eliminate secondary reflections and furthermore can easily be produced accurately. Such a mirror system is shown in Fig. 6 where 13 and 14 are cylindrical mirrors with their axes of curvature at right angles, 15 is a translucent screen, 16 a projector which projects a picture on the screen 15. This picture as it appears on the opposite side of the screen is reflected in mirror 14 and on account of the fact that the axis of curvature of this mirror is horizontal the image is increased in height while its width is unaffected. The reflection of this mirror is thrown into the second mirror 13. The axis of curvature of the second mirror is vertical; therefore it tends to increase the width of the reflected image without increasing its height. If the respective angles of these two mirrors is correct an effect will be produced quite the same as described with the cylindrical lenses. Therefore if an image of a vertical line appears on the screen anyone moving around the upper mirror in a horizontal plane will see this line slightly tilted from left to right and observing this line with two eyes independently it will appear tilted one way to one eye and somewhat tilted the other way to the other eye, but with the both eyes the line will appear vertical and to be hanging in space.

While the arrangement of Fig. 6 gives satisfactory results a still simpler arrangement is shown in Figs. 8 and 9 where only one mirror is employed. This is shown at 17 with an opaque screen 18, and a projector 19. In this case the projector is equipped with a corrective lens which tends to correct the lateral distortion of the picture caused by mirror 17. The operation of this arrangement is obvious, the light paths being shown by dotted lines.

Still another arrangement is shown in Figs. 10 and 11 which has many advantages over those previously described. For example it allows front projection, and also allows the screen to be used much nearer to the mirror with consequent decrease in mirror distortion and an increase in the angle of observation.

In this arrangement 20 represents a typical location of an observer, 21 a cylindrical mirror, 22 an opaque screen and 23 a projector. The mirror and screen are located on a stage 24 as in a theatre. The picture projected from 23 is shown in the mirror 21 which reflects it to the screen 22. The observer located at 20, or at other locations, observes in the mirror the reflected image of the picture as projected on the screen.

With this system the picture as seen directly on the screen 22 is considerably distorted or wedge-shaped but after reflection, or as viewed by the observer at 20 is brought back to normal, notwithstanding the tilt of the mirror, and appears to be hanging in space at the location 25 indicated in dotted lines. All other effects are as before described, and it is also possible to locate the screen so close to the mirror or well within the focal length thereof that the lateral magnification is negligible and therefore it is not necessary to use a corrective lens on the projector.

In order to allow the reflected image of this picture on the mirror to be shown by observers in various locations throughout the theatre it is necessary that this mirror exceeds in width and age of the picture as projected on the screen.

Due to the fact that third dimensional effects as described above are extremely difficult to analyze I do not wish to be limited in any way by the theory of operation which has been given above. The fact, however, remains that with the various elements positioned as described the depth or third dimensional effect is startlingly produced.

In the various figures shown the elements have been illustrated in certain definite locations but it is possible however to considerably alter the positions in some of the figures without changing the principle of operation or the effect produced so that it is possible to obtain the effect by projecting from the rear or from any other desired position. Also while the invention has been described in connection with a projected image it will be evident that any photograph or drawing may be viewed with this third dimensional effect by placing it in the position occupied by the screen in the figures. The invention, therefore, lends itself to use not only in still or motion picture projection but provides a means of obtaining depth effects in ordinary flat pictures.

Other modifications may be made without departing from the spirit of the invention and I do not therefore desire to limit myself to what has been specifically shown and described except as such limitations occur in the appended claims.

A separate optical apparatus for each observer to produce the results of the invention is not recommended as being impractical. However, the invention is intended to cover such an arrangement. Thus if the two images 1 and 2 of Fig. 1 are either printed on a flat surface or are projected upon a screen with the suitable angular relation between them and are given color values, for instance, red and green, the observer may look through a pair of spectacles having red and green glasses therein and see one image with one eye and the other image with the other. The superimposed images give him the third dimensional effect.

What I claim is:

1. In a system for producing stereoscopic effects in projected pictures, a screen, means to project an image upon said screen, and means optically interposed between an observer and said screen to cause the image as seen by one eye of the observer to be rotated with respect to the image seen by the other eye through an angle sufficient to produce a stereoscopic effect without causing undue eye strain.

2. In a system for producing stereoscopic effects in projected pictures, a screen, means to project an image upon said screen, and means including a cylindrical light controlling element optically interposed between said screen and an observer to cause the image seen by one eye of the observer to appear rotated with respect to that seen by the other eye through an angle sufficient to produce a stereoscopic effect without causing undue eye strain, said element having its optical axial plane substantially perpendicular to the plane of observation including the two eyes of the observer.

3. In a system for obtaining depth effects in projected pictures, a screen, means to project an image upon said screen, and means to cause the image seen by one eye of an observer to be slightly rotated with respect to that seen by the other eye, said means comprising a cylindrical light controlling element having the plane of its optical axis at substantially a right angle to the plane of observation including said eyes.

4. In a system for obtaining depth effects in projected pictures, a screen, means to project an image upon said screen, and means to cause the image seen by one eye of an observer to be rotated with respect to that seen by the other eye through an angle sufficient to produce a stereoscopic effect without causing undue eye strain, said means comprising a cylindrical mirror positioned so as to observe the reflected image therein and having its optical axial plane substantially at right angles to the plane of observation including said eyes.

5. In a system for producing depth effects in a single flat picture, and means optically interposed between said picture and an observer for causing the image seen by one eye of the observer to appear rotated with respect to the image seen by the other eye through an angle sufficient to produce a stereoscopic effect without causing undue eye strain, said means including a cylindrical light controlling element.

6. The method of securing depth effects in a single picture which comprises altering the direction of light rays emanating from the picture in one direction so that from that direction the picture appears at a definite rotational angle, and altering all of the rays emanating from said picture in another direction so that from the second direction the picture appears in the same plane but rotated with respect to that from the first direction through an angle sufficient to produce a stereoscopic effect without causing undue eye strain.

7. The method of producing a depth effect in a single flat picture which comprises projecting the picture upon a screen and viewing the projected picture through an optical system which causes each eye of an observer to see the picture rotated with respect to the picture seen by the other eye through an angle sufficient to produce a stereoscopic effect without causing undue eye strain.

8. The method of creating third dimensional effects from a flat picture which comprises projecting the picture into space, intercepting the projected beam in a flat plane, and altering the rotational angle of the picture as seen by one eye of an observer with respect to the picture as seen by the other eye through an angle sufficient to produce a stereoscopic effect without causing undue eye strain.

9. A method of producing depth effects from a flat picture which comprises projecting said picture upon a flat screen, interposing between the eyes of an observer and the picture means for causing the image seen by one eye to have a different rotational angle from the image seen by the other eye such that stereoscopic effects are produced without causing undue eye strain.

10. In a system for creating depth effects in projected pictures a screen, a concave cylindrical mirror positioned with its cylindrical axis at an angle to the plane of said screen, a projector, said screen, mirror, and projector being so positioned that the projector projects the picture onto said screen by reflecting it from said mirror, and an observer may observe the image of the screen in said mirror.

11. In a system for creating depth effects in projected pictures a screen, a concave cylindrical mirror positioned with its cylindrical axis at an angle to the plane of said screen and close enough to be well within the focal length of the mirror, a projector, said screen, mirror, and projector being so positioned that the projector projects the picture onto said screen by first projecting it into said mirror, and an observer may observe the image of the screen in said mirror.

12. An apparatus for obtaining stereoscopic effects in projecting pictures comprising a screen, means to project an image upon said screen, and a cylindrical lens positioned adjacent said screen and between said screen and an observer, the optical axial plane of said lens being at substantially right angles to the plane of observation including the two eyes of an observer and the geometric plane of said lens being at a small acute angle to a line drawn perpendicular to said plane of observation.

13. An apparatus for obtaining stereoscopic effects in projecting pictures comprising a screen, means to project an image upon said screen, a cylindrical lens positioned adjacent said screen and between said screen and an observer, the optical axial plane of said lens being at substantially right angles to the plane of observation including the two eyes of an observer and the geometric plane of said lens being at a small acute angle to a line drawn perpendicular to said plane of observation, and means to compensate for the magnification in one direction of said cylindrical lens.

14. A system for producing stereoscopic effects in projected pictures comprising a flat screen, means to project a flat picture upon said screen, a concave cylindrical mirror positioned with its concave reflecting side facing said screen and substantially parallel to it but offset from it in the direction of its axis of curvature and so positioned with respect to an observer that the optical axial plane of the mirror is substantially perpendicular to the plane of observation including the two eyes of an observer.

HAROLD P. DONLE.